(12) United States Patent
Sweatman et al.

(10) Patent No.: US 8,718,691 B2
(45) Date of Patent: *May 6, 2014

(54) UNIVERSAL SHORT CODE ADMINISTRATION FACILITY

(71) Applicant: Sybase 365, Inc., Reston, VA (US)

(72) Inventors: Phillip J. Sweatman, Vienna, VA (US); Robert C. Lovell, Jr., Leesburg, VA (US); Venkatesh Chava, Herndon, VA (US); Christian Zimmern, Fairfax, VA (US)

(73) Assignee: Sybase 365, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/853,285

(22) Filed: Mar. 29, 2013

(65) Prior Publication Data

US 2013/0217425 A1 Aug. 22, 2013

Related U.S. Application Data

(63) Continuation of application No. 13/020,434, filed on Feb. 3, 2011, now Pat. No. 8,423,059, which is a continuation of application No. 10/742,764, filed on Dec. 23, 2003, now Pat. No. 8,019,362.

(60) Provisional application No. 60/445,453, filed on Feb. 7, 2003.

(51) Int. Cl.
*H04W 4/14* (2009.01)

(52) U.S. Cl.
USPC ............ 455/466; 709/246; 709/203; 455/403

(58) Field of Classification Search
USPC .................................. 709/246, 203; 455/466
See application file for complete search history.

(56) References Cited

U.S. PATENT DOCUMENTS

| 5,351,235 A | 9/1994 | Lahtinen |
| 5,621,727 A | 4/1997 | Vaudreuil |
| 5,768,509 A | 6/1998 | Gunluk |

(Continued)

FOREIGN PATENT DOCUMENTS

| EP | 0777394 A1 | 4/1997 |
| EP | 0959600 A1 | 11/1999 |

(Continued)

OTHER PUBLICATIONS http://www.usshortcodes.com/Mar. 12, 2004.

(Continued)

*Primary Examiner* — Lester Kincaid
*Assistant Examiner* — Diego Herrera
(74) *Attorney, Agent, or Firm* — Kenyon & Kenyon LLP

(57) ABSTRACT

Systems and methods for assigning short codes to provide uniformity among wireless carriers. In the systems and methods, a Universal Short Code (USC) Administrator maintains a list of short codes and their lease status so that SMS messages sent to a particular short code may be routed to the proper holder of the short code. A network facilitator is in communication with both the USC Administrator and at least one wireless carrier to route the SMS message to the proper holder of the short code. The short code may be leased for a specified period of time so that the short code can be reassigned after expiration of the lease.

20 Claims, 5 Drawing Sheets

(56) References Cited

U.S. PATENT DOCUMENTS

| | | |
|---|---|---|
| 5,835,583 A | 11/1998 | Hetz et al. |
| 5,845,207 A | 12/1998 | Amin et al. |
| 5,887,249 A | 3/1999 | Schmid |
| 5,894,478 A | 4/1999 | Barzegar et al. |
| 6,061,716 A | 5/2000 | Moncreiff |
| 6,064,880 A | 5/2000 | Alanara |
| 6,134,432 A | 10/2000 | Holmes et al. |
| 6,208,870 B1 | 3/2001 | Lorello et al. |
| 6,230,009 B1 | 5/2001 | Holmes et al. |
| 6,240,293 B1 | 5/2001 | Koster |
| 6,292,669 B1 | 9/2001 | Meuronen et al. |
| 6,327,267 B1 | 12/2001 | Valentine et al. |
| 6,366,663 B1 | 4/2002 | Bauer et al. |
| 6,404,858 B1 | 6/2002 | Farris et al. |
| 6,421,437 B1 | 7/2002 | Slutsman |
| 6,421,733 B1 | 7/2002 | Tso et al. |
| 6,535,746 B1 | 3/2003 | Yu et al. |
| 6,560,226 B1 | 5/2003 | Torrey et al. |
| 6,587,680 B1 | 7/2003 | Ala-Laurila et al. |
| 6,594,254 B1 | 7/2003 | Kelly |
| 6,658,260 B2 | 12/2003 | Knotts |
| 6,674,357 B1 | 1/2004 | Bermel |
| 6,738,630 B2 | 5/2004 | Ashmore |
| 6,772,267 B2 | 8/2004 | Thaler et al. |
| 6,782,035 B1 | 8/2004 | Nakamura et al. |
| 6,782,038 B1 | 8/2004 | Khlat |
| 6,889,325 B1 | 5/2005 | Sipman et al. |
| 6,920,487 B2 | 7/2005 | Sofer et al. |
| 7,043,230 B1 | 5/2006 | Geddes et al. |
| 7,072,678 B2 | 7/2006 | Allison |
| 7,072,941 B2 | 7/2006 | Griffin et al. |
| 7,110,780 B2 | 9/2006 | Bantukul et al. |
| 7,155,243 B2 | 12/2006 | Baldwin et al. |
| 7,231,176 B2 | 6/2007 | Levy |
| 7,245,929 B2 | 7/2007 | Henderson et al. |
| 7,587,210 B2 | 9/2009 | Sweatman et al. |
| 8,019,362 B2 | 9/2011 | Sweatman et al. |
| 2001/0049636 A1 | 12/2001 | Hudda et al. |
| 2002/0012351 A1 | 1/2002 | Sofer et al. |
| 2002/0015403 A1 | 2/2002 | McConnell et al. |
| 2002/0016175 A1* | 2/2002 | Marce et al. .................. 455/466 |
| 2002/0016750 A1 | 2/2002 | Attia |
| 2002/0029189 A1 | 3/2002 | Titus et al. |
| 2002/0038259 A1 | 3/2002 | Bergman et al. |
| 2002/0112014 A1 | 8/2002 | Bennett et al. |
| 2002/0167909 A1 | 11/2002 | Balazinski et al. |
| 2003/0083078 A1 | 5/2003 | Allison et al. |
| 2003/0118027 A1 | 6/2003 | Lee et al. |
| 2003/0134614 A1* | 7/2003 | Dye .............................. 455/406 |
| 2003/0171993 A1 | 9/2003 | Chappuis |
| 2003/0202521 A1 | 10/2003 | Havinis et al. |
| 2003/0236823 A1 | 12/2003 | Patzer et al. |
| 2004/0032856 A1 | 2/2004 | Sandstrom |
| 2004/0122735 A1 | 6/2004 | Meshkin |
| 2004/0131081 A1 | 7/2004 | Bhatia et al. |
| 2004/0244102 A1 | 12/2004 | Benzon et al. |
| 2004/0260719 A1 | 12/2004 | Giraud-Sauveur et al. |
| 2004/0260838 A1 | 12/2004 | Lovell et al. |
| 2005/0027741 A1 | 2/2005 | Eichstaedt et al. |
| 2005/0176450 A1 | 8/2005 | Bantukul et al. |
| 2005/0180392 A1 | 8/2005 | Watkins |
| 2005/0197144 A1 | 9/2005 | Tam et al. |
| 2005/0209861 A1 | 9/2005 | Hewes et al. |
| 2005/0222933 A1 | 10/2005 | Wesby |
| 2006/0148495 A1 | 7/2006 | Wilson |
| 2006/0167699 A1* | 7/2006 | Rontynen et al. .................. 705/1 |
| 2007/0066328 A1 | 3/2007 | Sweatman et al. |
| 2007/0175978 A1 | 8/2007 | Stambaugh |
| 2007/0224979 A1* | 9/2007 | O'Neal et al. ................. 455/417 |

FOREIGN PATENT DOCUMENTS

| | | |
|---|---|---|
| WO | 9720442 | 6/1997 |
| WO | 9736434 | 10/1997 |
| WO | 9911078 | 3/1999 |
| WO | 9933226 | 7/1999 |
| WO | 0041533 | 7/2000 |
| WO | 0225875 | 3/2002 |
| WO | 0228129 A1 | 4/2002 |
| WO | 03019959 A1 | 3/2003 |
| WO | 03069924 A2 | 8/2003 |
| WO | 03081871 A1 | 10/2003 |
| WO | 2004073323 A2 | 8/2004 |
| WO | 2004105405 | 12/2004 |

OTHER PUBLICATIONS

European Supplementary Search Report, EP05770894, Mar. 31, 2011, (10 pages).

* cited by examiner

UNIVERSAL SHORT CODE ADMINISTRATION FACILITY

This application is a continuation of U.S. patent application Ser. No. 13/020,434, filed Feb. 3, 2011, which is a continuation of U.S. patent application Ser. No. 10/742,764, filed Dec. 23, 2003, which claims the benefit of U.S. Provisional Application No. 60/445,453 filed Feb. 7, 2003, all of which are incorporated herein by reference in their entireties.

BACKGROUND

1. Field of the Invention

The present invention is related to improvements in mobile telephone networks' Short Message Service (SMS). More particularly, the present invention is related to systems and methods for administering, monitoring and controlling short codes such that the short codes can be employed consistently across different networks.

2. Background

Short Message Service (SMS) is a convenient and easy to use messaging application available to mobile telephone users. SMS offers a new way to communicate by sending text or data messages between mobile phones or between a mobile phone and information devices, such as a personal computer (PC), a PDA (personal digital assistant), or a handheld email/calendar organizer (e.g., a wireless email device). Messages are composed of words, up to 160 characters in length for Latin alphabets (about 30 to 40 words) and 70 characters for non-Latin alphabets like Arabic and Chinese. To send, text messages are keyed into a mobile phone keypad or other information device. Received text messages are presented on the mobile telephone's screen.

Usually, messages are delivered almost immediately, even when the mobile phone is in use. However, if the phone is turned off, for example, or if the user is in an area without cellular coverage, messages are stored in the network and delivered as soon as the phone is switched back on or the phone enters an area that has coverage.

Introduced in Europe and the United Kingdom (U.K.) during the mid-1990s and in Asia soon thereafter, SMS encountered great enthusiasm, especially among teenagers and young adults. And although SMS had originally been conceived as a paging system, users quickly adapted text messaging for their own objectives. By the late 1990s, GSM carriers in both Europe and the U.K. had connected their networks, allowing their subscribers to exchange text messages across other GSM carriers. In 2001, 700 million mobile phone users worldwide sent 20 billion messages every month, making SMS the fastest growing service in the wireless industry.

Typically, messages are addressed to another telephone via the telephone number belonging to the recipient's mobile telephone. On the other hand, a portion of messages that are sent via SMS are not sent to another telephone or PDA as in a Person-to-Person communication, but are instead directed to a central location. While the central location could have a regular 10-digit telephone number as does a typical mobile telephone, SMS messages directed to a central location are often so-directed using a short code address. A short code address is a convenient short number that identifies a central location to which an SMS message can be sent. A typical application of short code use is Tele-voting in which, for example, a television program flashes on the screen instructions to "Send an SMS message to 8012 to vote yes." In the United States, exclusive ranges of available short codes have been assigned to each of the several mobile telephone service providers to be used at their discretion. Consequently, the market penetration for, for example, a Tele-voting application, is limited because the designated short code will operate on (or only have meaning to) a particular mobile telephone service provider.

In other words, if the television program flashes a single SMS short code on the screen, only the votes of users who happen to be customers of the service provider that "owns" that short code will be received. Thus, any resulting vote will necessarily be skewed, since only a segment of the viewing population will have the opportunity to vote.

The foregoing use and associated problems with this type of short code use is meant to be exemplary only. Those skilled in the art will appreciate that there are myriad other uses for short codes, but all such uses would still have the deficiency of having short codes restricted to a particular service provider.

BRIEF SUMMARY OF THE INVENTION

In a preferred embodiment of the present invention a single centralized SMS Universal Short Code (USC) Administrator (UA) maintains a database containing all of the available short codes and whether they are currently in use. The available short codes may include all four digit, five digit, six digit, or other short code number combinations.

When an Application Provider (AP) needs a short code, either a particular short code or any randomly available short code, it submits a request for a short code to the UA. The AP may want to use a particular code for any number of purposes, such as, for example, promotional activities, tele-voting, advertising campaigns. The UA reviews the request and, upon approval, "leases" the short code to the AP. In this context, the term "lease" means that the UA assigns the short code to the AP for a specific period of time. Once the AP has leased the short code, it informs the public of the existence of the short code and encourages the public to perform some task using the short code, such as "Send a SMS to 8012 to enter the contest."

When a mobile subscriber (MS) sends an SMS message using the short code, the message is transmitted to the subscriber's wireless carrier (WC). The WC, in turn, passes the SMS message to a Network Facilitator (NF). In a preferred implementation, the NF is an SMS message routing intermediary, which is capable of receiving SMS messages and routing them to the specified destination, even between different wireless carriers.

Upon receipt of the message, the NF issues a routing request to the UA to resolve the short code. The UA then returns a routing response to the NF indicating the AP that is associated with the short code at that particular point in time so that the NF can deliver the SMS message to the proper AP.

Thus, as can be readily appreciated, it is possible to temporarily assign a short code to one AP for a lease period and, thereafter, assign the same short code to another AP. By temporarily assigning short codes it is possible to ensure that a sufficient number of short codes are available. In addition, it is possible for APs to provide services to a greater number of MSs across different WCs without concern about each WC using its own short codes.

The foregoing and other features and attendant advantages of the present invention will be more fully appreciated upon a reading of the following detailed description in conjunction with the associated drawings.

DETAILED DESCRIPTION OF THE INVENTION

Figure 1:
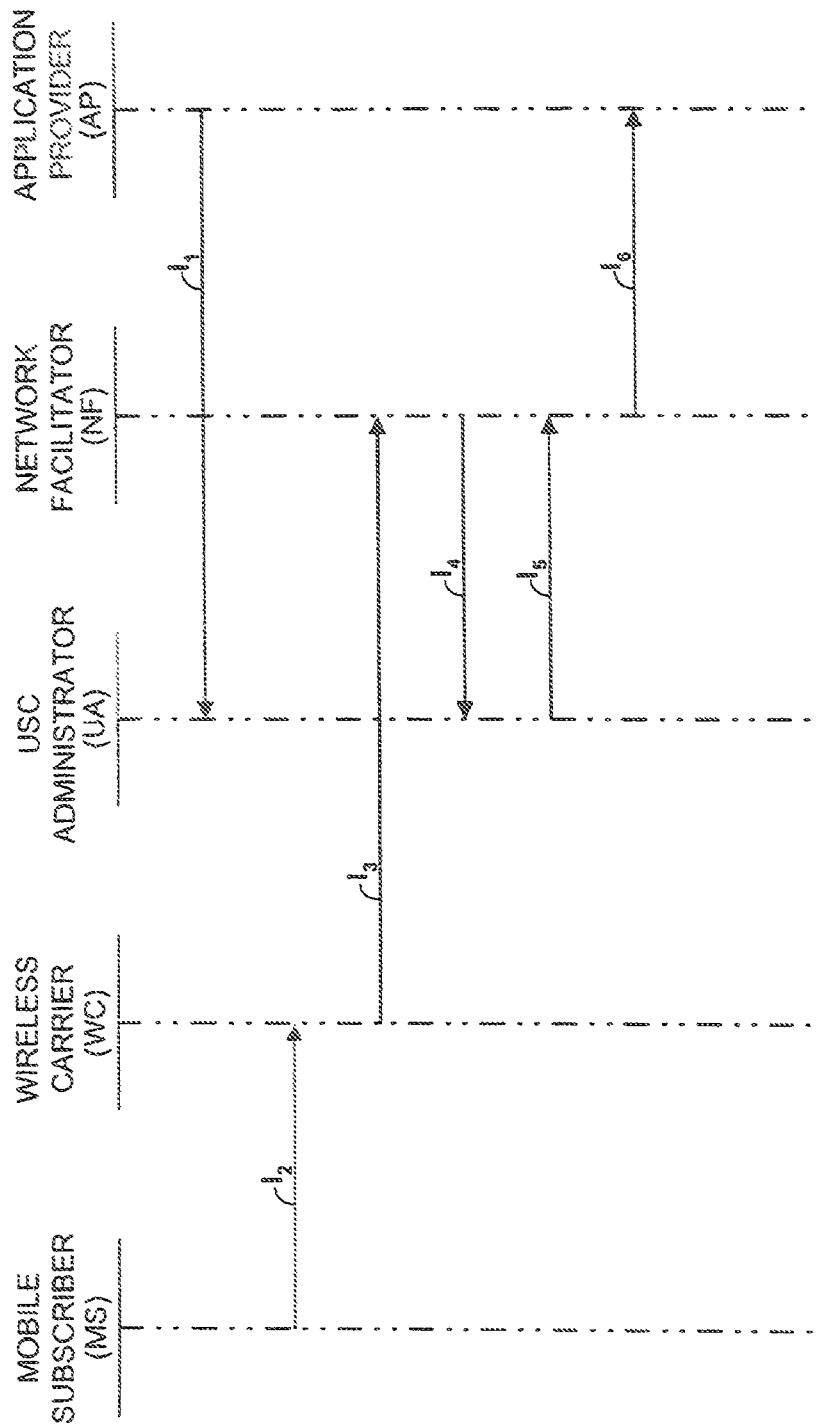
FIG. 1 is a diagram representing an exemplary implementation of an embodiment of the present invention.

The present invention addresses the short code deficiency described above with respect to the prior art by implementing a universal short code regime that is administered by, for example, a third party, and that enables the use of the same short codes across different service providers.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

FIG. 1 provides a general overview of the present invention. In this exemplary embodiment, a single centralized SMS Universal Short Code (USC) Administrator (UA) maintains a database containing all of the available short codes and whether they are currently in use. The available short codes may include all four digit, five digit, six digit, or other short code number combinations.

When an Application Provider (AP) needs a short code, either a particular short code or any randomly available short code, it submits a request for a short code to the UA at $I_1$. The AP may want to use a particular code for any number of purposes, such as, for example, promotional activities, televoting, advertising campaigns. The UA reviews the request and, upon approval, "leases" the short code to the AP. In this context, the term "lease" means that the UA assigns the short code to the AP for a specific period of time. Once the AP has leased the short code, it informs the public of the existence of the short code and encourages the public to perform some task using the short code, such as "Send a SMS to 8012 to enter the contest."

When a mobile subscriber (MS) sends an SMS message using the short code, it is transmitted to a wireless carrier (WC) at $I_2$. The WC, in turn, passes the SMS message to a Network Facilitator (NF) at $I_3$. The NF is preferably an SMS message routing intermediary, which is capable of receiving SMS messages and routing them to the specified destination. Such an intermediary is described in U.S. Ser. No. 10/426,662, filed May 1, 2003, which is incorporated herein by reference in its entirety.

The NF issues a routing request to the UA to resolve the short code at $I_4$. The UA then returns a routing response to the NF indicating the AP that is associated with the short code at that particular point in time at $I_5$ so that the NF can deliver the SMS message to the proper AP at $I_6$.

In this exemplary embodiment, it is possible to temporarily assign a short code to one AP for a lease period and, thereafter, assign the short code to another AP. By temporarily assigning short codes it is possible to ensure that a sufficient number of short codes are available. In addition, it is possible for APs to provide services to a greater number of MSs across different WCs without concern about each WC using its own short codes.

Figure 2:
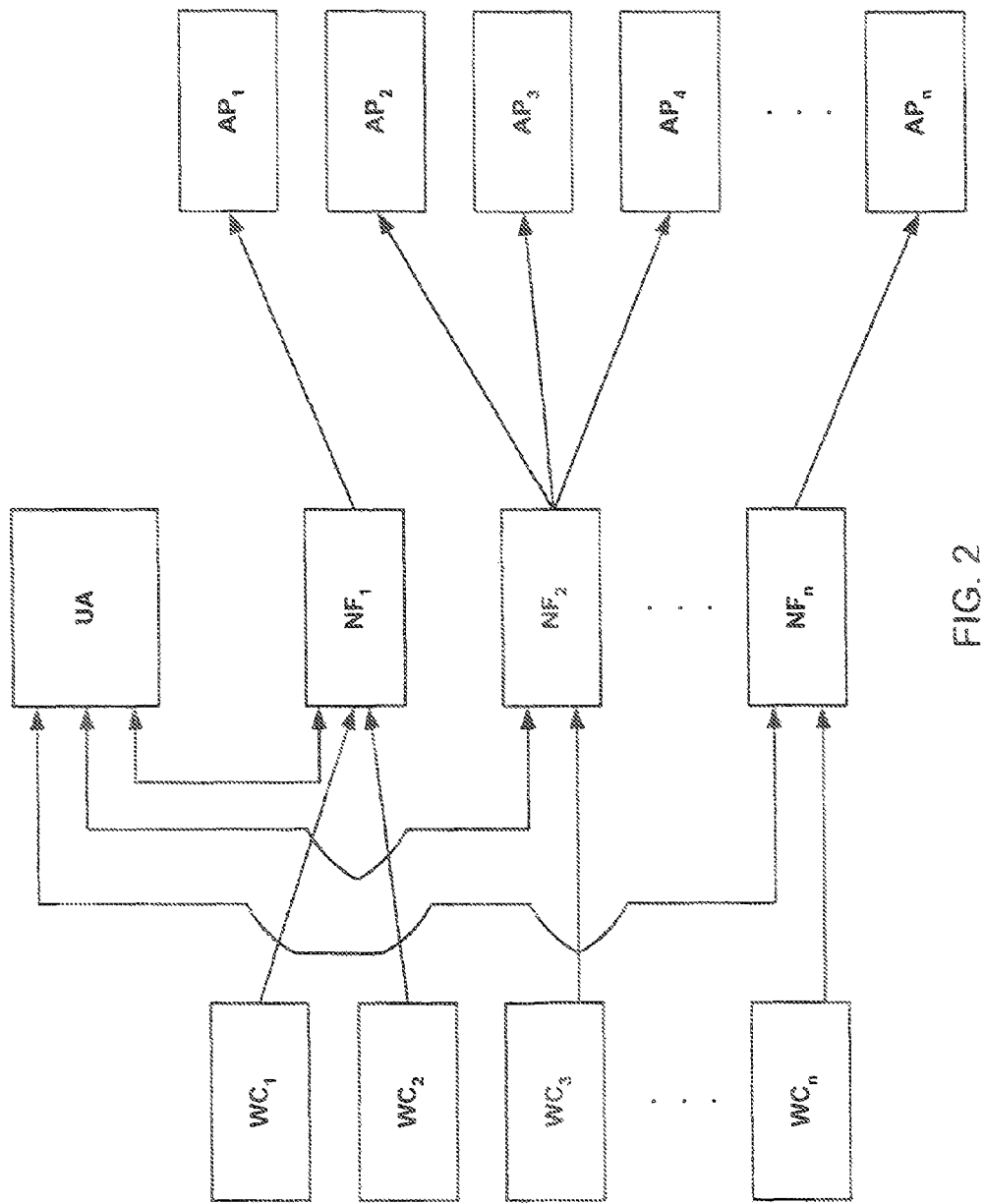
FIG. 2 shows a schematic diagram representing a physical implementation of a portion of the present invention shown in FIG. 1.
Figure 3:
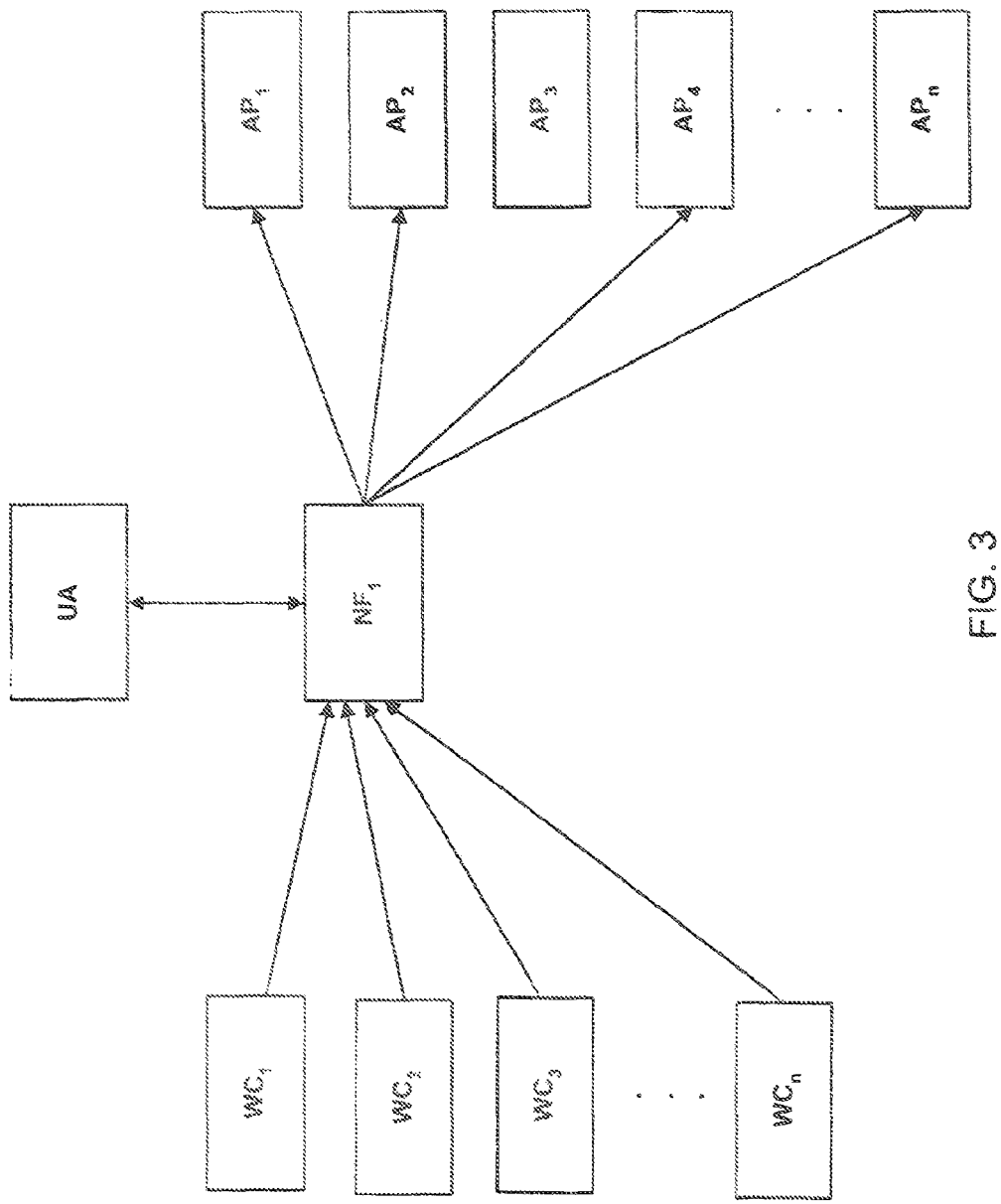
FIG. 3 shows a schematic diagram representing an alternative physical implementation of a portion of the present invention shown in FIG. 1.

FIGS. 2 and 3 show various exemplary embodiments of physically implementing such a system between one or more WCs and one or more APs. More specifically, FIG. 2 shows an exemplary embodiment where multiple wireless carriers $WC_1$, $WC_2$, $WC_3$, ... $WC_n$ interact with multiple Network Facilitators $NF_1$, $NF_2$, $NF_3$, ... $NF_n$. The Network Facilitators, in turn, are in communication with a USC Administrator (UA) as well as multiple Application Providers $AP_1$, $AP_2$, $AP_3$, ... $AP_n$.

As shown in FIG. 2, any NF can be in communication with one or more WCs. The NFs can also communicate amongst themselves using known "peering" arrangements. By providing multiple NFs it may be possible to more efficiently process SMS messages sent using short codes because each NF will have more resources available. Moreover, it may be possible to set up the system so that each NF is optimized dependent on the type of messaging protocol, such as, for example, Short Message Peer-to-Peer (SMPP), Simple Mail Transfer Protocol (SMTP), Hyper Text Transfer Protocol (HTTP), between the WCs, the NFs, and the APs. Furthermore, each NF may be geographically dispersed so that message routing by the WCs may be streamlined.

FIG. 3 shows another exemplary embodiment where multiple wireless carriers $WC_1$, $WC_2$, $WC_3$, ... $WC_n$ interact with a single Network Facilitator $NF_1$. The Network Facilitator, in turn, is in communication with a USC Administrator (UA) as well as multiple Application Providers $AP_1$, $AP_2$, $AP_3$, ... $AP_n$. By providing a single NF it may be possible for a single entity to control and maintain both the UA and the NF functionality. It is also understood that each of the entities described above (i.e., WCs, NFs, UA, APs) may be realized as a single entity or as a logical collection of entities.

Figure 4:
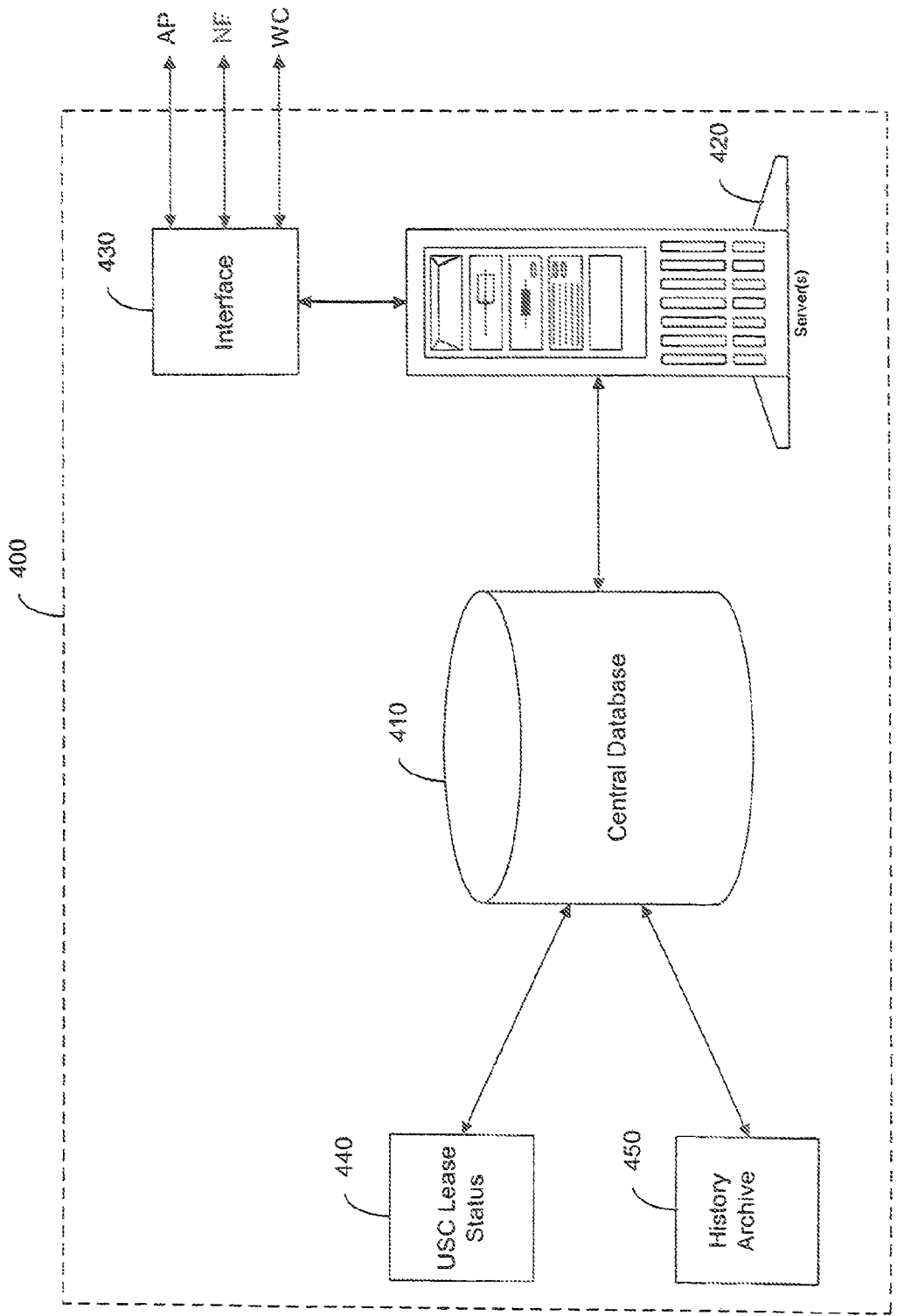
FIG. 4 shows a schematic diagram of an exemplary embodiment of a Universal Short Code Administrator shown in FIG. 1.

An exemplary embodiment of a UA 400 is shown in FIG. 4. In this embodiment, the UA includes a centralized database 410, one or more servers 420, and an interface 430 for monitoring the server 420. The interface is preferably configured to send and receive commands/requests to and from one or more APs, WCs, and NFs. These commands/requests may be in the form of XML commands or any other suitable forms. In addition, the interface 430 may include a graphical user interface to assist in the monitoring and controlling of the UA 400.

The centralized database 410 preferably includes at least two files that maintain the status of the short codes. A lease status file 440 contains a list of all short codes that have been leased and the status of the lease. The status of the lease may include the holder of the lease (the AP), time remaining on the lease, and any other relevant information. A history archive file 450 is provided for auditing purposes. This file may contain information about all APs that have been assigned to a particular short code, the duration that the short code was leased by each AP, the number of times the short code was accessed during each lease, or any other information that would be tracked for auditing purposes. In addition, the centralized database 410 may include files that store profiles for all external entities—APs, WCs, and NFs—that communicate with the UA 400. These profiles may contain information identifying the particulars of, and the options for, each of the external entities. The centralized database 410 may also include configuration files that specify the acknowledgement model used by the UA. The acknowledgement models will be described below in relation to FIG. 5.

Figure 5:
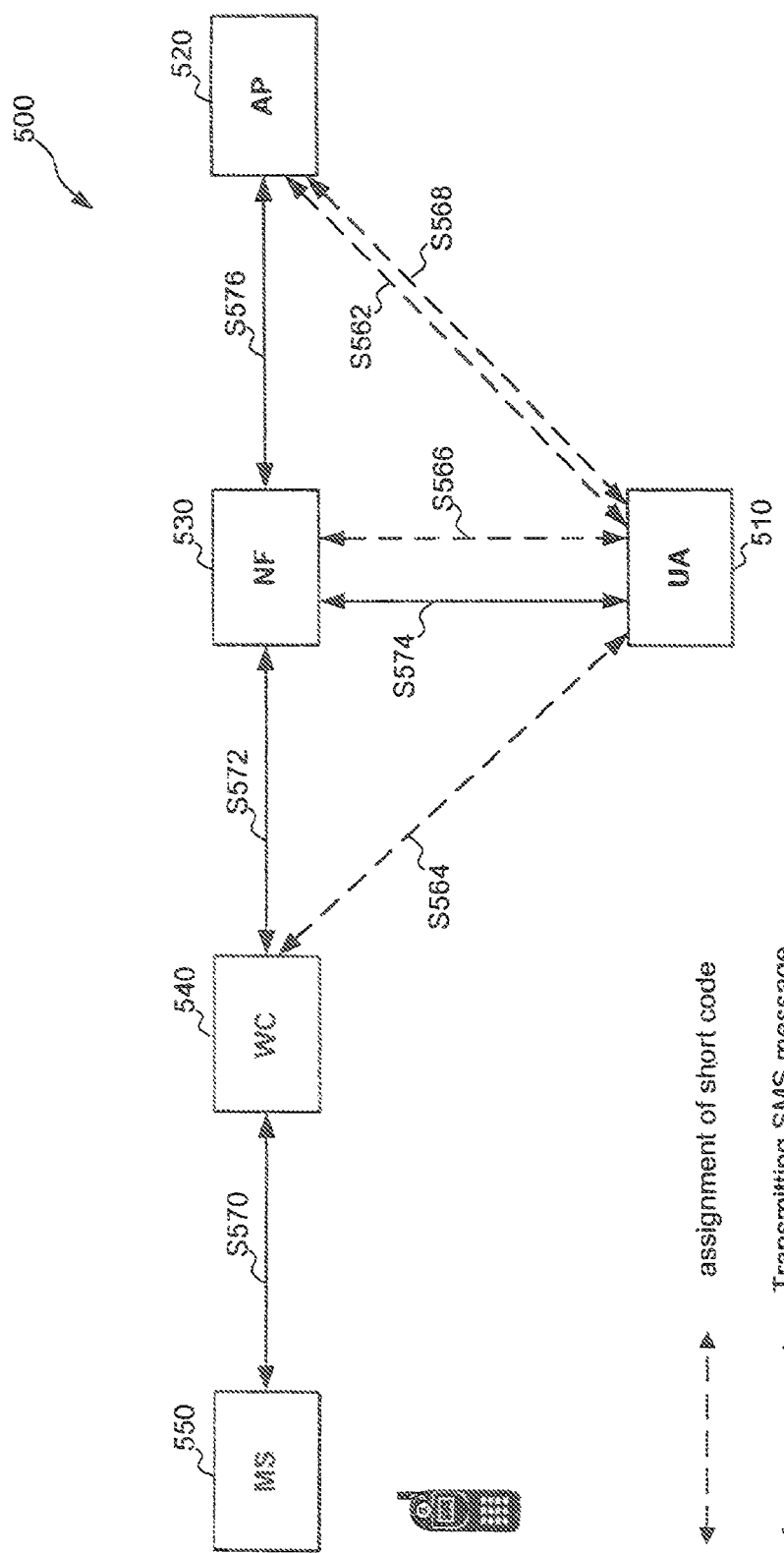
FIG. 5 shows schematically the interaction of components shown in FIG. 1.

FIG. 5 shows the interaction of an exemplary system 500 including a MS 550, WC 540, NF 530, AP 520, and UA 510 of the exemplary embodiment shown in FIG. 1. For sake of simplicity, FIG. 5 shows only one of each component, but it is understood that there may be one or more MSs, one or more WCs, one or more NFs, one or more APs, and a single UA. Although multiple UA's are possible, there is preferably, from a logical point of view, only a single UA. In FIG. 5, the WC 540, NF 530, and AP 520 are all assumed to have successfully completed a qualification and approval process with the UA 510 and are recognized by the UA 510. This process may be any known process that satisfies the UA's requirements for authentication. Each entity may be assigned a permanent identification value that is used when interacting with the UA 510. The identification value may be used for authentication, tracking, or other reporting functions by the UA 510. As stated above, there may be any number of WCs, NFs, and APs that are recognized by the UA.

Once AP 520 determines that it will need a short code for an upcoming event, such as, for example, promotional campaign or tele-voting, AP 520 establishes a secure TCP/IP connection with a server of UA 510 and requests a logical session be established between AP 520 and UA 510. For example, AP 520 may send a session request that includes AP 520's identification value and password, if required. UA 510 receives the session request from AP 520, logs the request, performs a validation and authentication operation, and returns a positive acknowledgement to AP 520.

Once the session request is acknowledged, AP 520 submits a lease request for a particular (or randomly available) short code for a specified period of time. For example, when a particular short code is requested, the AP 520 may send a lease request for short code 8012 with a start date of Dec. 9, 2002 and an end date of Dec. 13, 2002. UA 510 receives the lease request from AP 520 and logs the request. UA 510 then performs a series of validation and authentication operations to determine that the short code is available for lease during the requested time, period. For example, UA 510 may read the lease status file stored on the centralized database to determine whether the short code is available. If the short code is available, UA 510 updates the centralized database to reflect that short code 8102 has been requested by AP 520 for the time period of Dec. 9, 2003 through Dec. 13, 2003 and is pending approval. This information may be identified with a unique lease identification value.

Alternatively, when a random available short code is requested, the UA looks for the next available short code and updates the centralized database to reflect that the next available short code has been requested for a specified period of time and is pending approval.

Finally, the UA 510 may issue a response back to AP 520 including the lease identification value and the pending status. This entire session interaction for the particular (or randomly available) short code is shown at S562 in FIG. 5.

UA 510 may issue a short code lease review request to WC 540 at 5564 and/or NF 530 at S566. The WC 540 and/or NF 530 review the short code lease review request and, provided that everything is in order, in an exemplary embodiment issue a positive acknowledgement back to the UA 510. After receiving positive acknowledgement from the WC 540 and/or NF 530, the UA 510 logs the responses and performs a series of validation and authentication operations. UA 510 updates its centralized database to indicate that short code 8102 has been leased to AP 520 for the time period Dec. 9, 2003 through Dec. 13, 2003. UA 510 returns a positive acknowledgement that the lease is approved to AP 520 at 5568.

There are alternative acknowledgement models that may be used in place of the positive acknowledgement model described above. For example, the UA 510 may set a threshold value, which may be less than the total number of WCs and NFs sent the short code lease review, for the number of positive acknowledgements necessary for lease approval. Alternatively, a negative acknowledgement model may be used. For this model, the UA 510 would set a threshold value for which the number of negative responses cannot exceed if the lease is to be approved. This may be set as low as 1 so that a single WC or NF can block the lease assignment. In this model, only those WCs and NFs that do not want the short code to be leased need respond.

A further modification to either the positive or negative acknowledgement model includes assigning a "weighting" value or factor to each responding WC or NF. At any point in time the resulting "weighted" lease response total equals:

$$\Sigma(\text{WeightingFactor}_i * \text{Entity}_i)$$

where WeightingFactor$_i$ is the weighting factor assigned to the entity (WC or NF) and Entity$_i$ is the response of the entity.

Each entity may have a different weighing value depending on which entities a UA wants to give special preference to. For example, the UA may give greater preference to NFs, or a particular NF, over all other entities. Alternatively, the UA may give greater preference to one or more WCs if they are the predominate WCs in the area. These weighting values may be adjustable over time based on market factors, contracts, or any other changing conditions.

The UA may also want to specify a particular period for responding to the lease request, such as, for example, several hours, one or more calendar days, or an infinite number of days. This period for responding along with choosing a particular acknowledgement model provides great flexibility to the UA.

After the lease is approved to AP 520 at S568, MS 550 sees AP's promotional use of short code 8102 and sends an SMS message to short code 8102. This may be accomplished through a number of intermediary steps. For example, the SMS message is transmitted to WC 540 at S570. WC 540 determines that the SMS message is addressed to a particular short code and forwards the message to NF 530 associated with the WC 540 at S572.

NF 530 receives the SMS message and issues a routing inquiry to the UA 510 to resolve the destination for short code 8102. In other words, to authoritatively determine which AP 520 the NF 530 should deliver the SMS message to. NF 530 establishes a secure TCP/IP connection with the UA 510 and establishes a logical session with the UA 510 and receives a session ID. After establishing the logical session, NF 530 sends a short code routing request for the particular short code. The UA 510 receives and logs the short code routing request and performs a series of validation and authentication operations. The UA 510 returns a routing response to NF 530 indicating which AP 520 is currently associated with the particular short code.

NF 530 delivers the SMS message to AP 520 after receiving the routing response from UA 510. AP 520 processes the SMS message appropriately. Any subsequent messaging traffic may follow a path similar to the path described above.

One advantage to the above system is that the AP leases the short code for a specific period of time, after which, the short code may be reassigned to another AP. Any subsequent SMS messages to the short code may indicate that it is unassigned or be transmitted to a different AP that is leasing the short code. Therefore, a finite number of short codes may be utilized to serve a much larger group of APs. Moreover, the UA may monitor the volume of SMS message traffic addressed to the short code, for example, by monitoring the number of incoming short code routing requests. Depending on circumstances, such as, for example, a low usage with a lengthy lease period or a low usage with a desirable short code, the UA may optionally rescind the short code lease.

In addition, a further modification to the leasing of short codes includes providing an automatic lease renewal for a number of time periods, where each time period is defined as a number of days. This would allow an AP to have extended use of an assigned short code without having to send repeated requests each time a short code lease is set to expire. The UA may maintain control by setting a limit as to the number of automatic lease renewals or by monitoring the use of the short code.

It should be understood that the physical implementation of the system may include any number of elements that increase performance, improve operational reliability, or improve operational efficiency. For example, a NF may cache or store locally some or all of the routing information returned from the UA for a particular short code. In such a scenario, the NF would be responsible for ensuring that the cache or locally stored information is synchronized with the UA's authoritative list.

The UA may also "broadcast" information to all interested parties at specified periods. For example, the broadcast may include information about which short codes' leases are to expire the following day and/or the short codes leased that day. The interested parties may include all NFs associated with the UA. This broadcast may be continuous or scheduled (e.g., hourly, daily, weekly) to exchange or transfer information from the UA to the NF containing updates on short code lease assignments. The NFs may also broadcast information that is locally cached to the UA continuously or at scheduled times regarding short code usage to assist the UA in monitoring the short code usage and determining whether a short code lease should be terminated.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. Within a message processing entity, a server-based method for routing a Short Message Service (SMS) message towards an Application Provider (AP), the server-based method comprising:

receiving at a first gateway the SMS message, the SMS message (1) having a Universal Short Code (USC) as a destination address and (2) having been originated by a Mobile Subscriber;

processing aspects of the SMS message including at least using information received from a USC administrator to identify from the USC the AP associated with the USC; and sending from a second gateway aspects of the SMS message towards the identified AP, wherein the information received from the USC administrator comprises information regarding the temporal association of respective USCs to APs.

2. The server-based method according to claim 1, wherein processing further includes issuing a routing request, comprising the USC, and receiving a routing response, comprising an indicia of the AP associated with the USC.

3. The server-based method according to claim 1, wherein receiving comprises receiving the SMS message from a wireless carrier.

4. The server-based method according to claim 1, wherein the message processing entity is optimized with respect to a type of messaging protocol.

5. The server-based method according to claim 4, wherein the messaging protocol is one of Short Message Peer-to-Peer (SMPP), Simple Mail Transfer Protoocl (SMTP) or Hyper Text Transfer Protocol (HTTP).

6. The server-based method according to claim 1, further comprising receiving a short code lease review request from the USC administrator.

7. The server-based method according to claim 6, further comprising sending a positive acknowledgement, responsive to the short code lease review request, to the USC administrator.

8. A processor-based system operable to route a Short Message Service (SMS) message towards an Application Provider (AP), the processor-based system comprising:

a first gateway operable to receive the SMS message, the SMS message (1) having a Universal Short Code (USC) as a destination address and (2) having been originated by a Mobile Subscriber;

a processor operable to process aspects of the SMS message including at least using information received from a USC administrator to identify from the USC the AP associated with the USC; and a second gateway operable to send aspects of the SMS message towards the identified AP, wherein the information received from the USC administrator comprises information regarding the temporal association of respective USCs to APs.

9. The processor-based system according to claim 8, wherein the processor is further operable to issue a routing request, comprising the USC, and receive a routing response, comprising an indicia of the AP associated with the USC.

10. The processor-based system according to claim 8, wherein the first gateway is operable to receive the SMS message from a wireless carrier.

11. The processor-based system according to claim 8, wherein the message processing entity is optimized with respect to a type of messaging protocol.

12. The processor-based system according to claim 11, wherein the messaging protocol is one of Short Message Peer-to-Peer (SMPP), Simple Mail Transfer Protocol (SMTP) or Hyper Text Transfer Protocol (HTTP).

13. The processor-based system according to claim 8, wherein the processor is further operable to process a short code lease review request from the USC administrator.

14. The processor-based system according to claim 13, wherein the processor is further operable, responsive to the short code lease review request, to cause a positive acknowledgement to be sent to the USC administrator.

15. A computer program product comprising a non-transitory computer readable medium having computer program logic recorded thereon operable to route a Short Message Service (SMS) message towards an Application Provider (AP), the computer program logic further being operable to:
   enable a first gateway to receive the SMS message, the SMS message (1) having a Universal Short Code (USC) as a destination address and (2) having been originated by a Mobile Subscriber;
   process aspects of the SMS message including at least using information received from a USC administrator to identify from the USC the AP associated with the USC; and
   enable a second gateway to send aspects of the SMS message towards the identified AP,
   wherein the information received from the USC administrator comprises information regarding the temporal association of respective USCs to APs.

16. The computer program product according to claim 15, wherein the computer program logic is further operable to issue a routing request, comprising the USC, and receive a routing response, comprising an indicia of the AP associated with the USC.

17. The computer program product according to claim 15, wherein computer program logic is operable to enable the first gateway to receive the SMS message from a wireless carrier.

18. The computer program product according to claim 15, wherein the computer program logic is optimized with respect to a type of messaging protocol.

19. The processor-based system according to claim 18, wherein the messaging protocol is one of Short Message Peer-to-Peer (SMPP), Simple Mail Transfer Protocol (SMTP) or Hyper Text Transfer Protocol (HTTP).

20. The computer program product according to claim 15, wherein the computer program logic is further operable to process a short code lease review request from the USC administrator.

* * * * *